United States Patent

Cserteg et al.

[11] Patent Number: 5,820,418
[45] Date of Patent: Oct. 13, 1998

[54] ELECTRIC LAMP AND METHOD FOR FIXING THE LIGHT SOURCE AND THE BASE PART OF THE LAMP TO EACH OTHER

[75] Inventors: Erzsebet Cserteg; Jozsef Fulop; Miklos Hargitai; Gyorgyi Horvath; Jozsef Tokes, all of Budapest, Hungary

[73] Assignee: General Electric Company, Schenectady, N.Y.

[21] Appl. No.: 671,776

[22] Filed: Jun. 17, 1996

[30] Foreign Application Priority Data

Jun. 21, 1995 [HU] Hungary ............................... P9501829

[51] Int. Cl.$^6$ .................................................. H01R 17/00
[52] U.S. Cl. ........................................................ 439/669.2
[58] Field of Search ............................ 439/699.2, 546–8, 439/602, 619

[56] References Cited

U.S. PATENT DOCUMENTS 5,630,729  5/1997  Francis .................................. 439/699.2

*Primary Examiner*—Khiem Nguyen
*Assistant Examiner*—Eugene G. Byrd
*Attorney, Agent, or Firm*—Fay, Sharpe, Beall, Fagan, Minnich & McKee

[57] ABSTRACT

The invention relates to an electric lamp, especially a compact fluorescent lamp comprising a light source as well as a base part constructed to be suitable for supporting and for mechanically and electrically connecting the light source to a lampholder and embracing the ends of the light source where the ends of the electrical leads of the light source are connected to contacts fixed on the base part.

The invention also relates to a method for fixing the light source and the base part of an electric lamp, especially of a compact fluorescent lamp to each other.

The essential feature of the lamp according to the invention is that an adapter piece embracing at least one of the ends of the light source being with its ends in the base part is fixed to the end(s) of the light source, and the adpapter piece is fixed to the base part.

The essential feature of the method according to the invention is that an adapter piece is placed on at least one end of the light source provided with a pinched portion which adapter piece is fixed on the pinched portion of the lamp by snapping, and the surfaces of the adapter piece and of the pinched portion are formed to be suitable for being snapped into each other, and the end(s) provided with the pinched portion(s) of the light source is (are) placed into the base part, and the adapter piece(s) is (are) fixed here by means of a permanent joint.

7 Claims, 1 Drawing Sheet

ELECTRIC LAMP AND METHOD FOR FIXING THE LIGHT SOURCE AND THE BASE PART OF THE LAMP TO EACH OTHER

FIELD OF THE INVENTION

This invention relates to an electric lamp, especially a compact fluorescent lamp comprising a light source as well as a base part supporting and mechanically and electrically connecting the light source to a lampholder and embracing the ends of the light source where the ends of the electrical leads of the light source are connected to contacts fixed on the base part.

This invention also relates to a method for fixing the light source and the base part of an electric lamp, especially of a compact fluorescent lamp to each other.

BACKGROUND OF THE INVENTION

Connection of compact fluorescent lamps to the mains supply is ensured by a special plastic base part on which contacts are made for connection to the mains. The electrode leads entering the light source, i.e. the discharge tube, are connected to these contacts. The discharge tube of a compact fluorescent lamp comprises two or more tube portions connected to each other. At one end of these tube portions, a pinched portion is usually provided for sealing the electrodes and exhaust tubes. During assembling the discharge lamp, the pinched ends of the tube portions of the discharge tube are placed into the so-called cap part of the base part. The ends of the tube portions are introduced through round openings formed in the said cap part. Having introduced into the cap part, the ends of the tube portions of the discharge tube are fixed to it with a bonding material, e.g. with a cement or an adhesive.

A disadvantage of fixing with a cement or an adhesive is, among others, that it is not fully reproducible. In addition, the cement may be pulverized in time which leads to the loosening of the joint and, in turn, to a shortening of lamp life. A further disadvantage of a joint produced whether by means of an adhesive or a cement is that in cases when a small space is available, e.g. at discharge tubes comprising two tube portions, the place of the joint will be hard to access for a cement or adhesive doser. This has an additional disadvantage that the bonding material will often be overdosed, a result affecting lamp appearance adversely.

SUMMARY OF THE INVENTION

The objective of our invention was to provide a solution that eliminates the disadvantages described above, and that ensures a firm joint between the discharge tube and the base part for the whole lamp life.

The recognition that has led to our invention was that the objective set can be achieved by providing the joint between the light source and the base part by an adapter piece or pieces which is (are) fixed onto the end(s) of the light source or the tube portions of the light source. After this, the said adapter piece(s) is (are) fixed to the base part.

In accordance with the above, our invention is an electric lamp, especially a compact fluorescent lamp comprising a light source and a base part that embraces the ends of the light source and is constructed for supporting the light source and connecting it to a lampholder mechanically and electrically. The ends of the electric leads of the light source are connected to contacts fixed to the base part, and an adapter piece is fixed to at least one end of the light source which adapter piece embraces the end(s), and is fixed to the base part.

The bulb of the light source is usually made from glass or a glassy material, and the adapter piece placed on said bulb of the light source is usually made from an elastic plastic material.

It is advantageous if a pinched portion is produced at the ends of the glass or glassy bulb of the light source, and the adapter piece is formed to fit to a surface indentation or protrusion formed on the pinched portion. This means that an adapter surface having a protrusion or indentation is matched to a glass surface having an indentation or a protrusion, respectively, which results in fixing the adapter piece on the pinched portion by means of a releasable joint.

As regards manufacturing process considerations, that version in which an indentation is formed on the pinched portion, and a locking component is made on the adapter piece which protrudes from it and is snapped into that indentation, is a simpler and more practical solution.

In order to produce a completely firm joint, the adapter piece is fixed to the base part by means of a permanent joint.

In addition, our invention is a method for fixing the pinched end portion to the base part of the light source of an electric lamp, especially of a compact fluorescent lamp. When using the method, an adapter piece is placed on at least one of the pinched end portions of the light source, the said adapter piece is fixed on the pinched portion of the light source by snapping. The adapter piece and the pinched portion are formed so that they may be snapped into each other. After the snapping operation, the pinched end(s) of the light source is (are) placed into the base part, and the adapter piece(s) is (are) fixed here by means of a permanent joint.

It is advantageous if a shoulder portion is formed on the adapter piece which shoulder portion will seat on the base part after assembling. The permanent joint is made on the surface where the base part and the shoulder portion meet; the permanent joint may be produced by means of adhesive sticking, ultrasonic welding, etc.

The solution according to the invention has the advantages that it may be well reproduced, and provides a firm and long-life joint between the light source and the base part of the lamp. In addition to providing a firm joint, it, e.g. in case of compact fluorescent lamps, also eliminates the rigid joint between the glass discharge tube and the base part. This kind of joint is produced, e.g., in case of using a cement or an adhesive. This rigid joint may even lead to a fracture of the glass due to its thermal expansion.

BRIEF DESCRIPTION OF THE DRAWINGS

Our invention will be described in more details by means of an embodiment illustrated by figures.

DETAILED DESCRIPTION OF THE PREFERRED EMBODIMENTS

Figure 1:
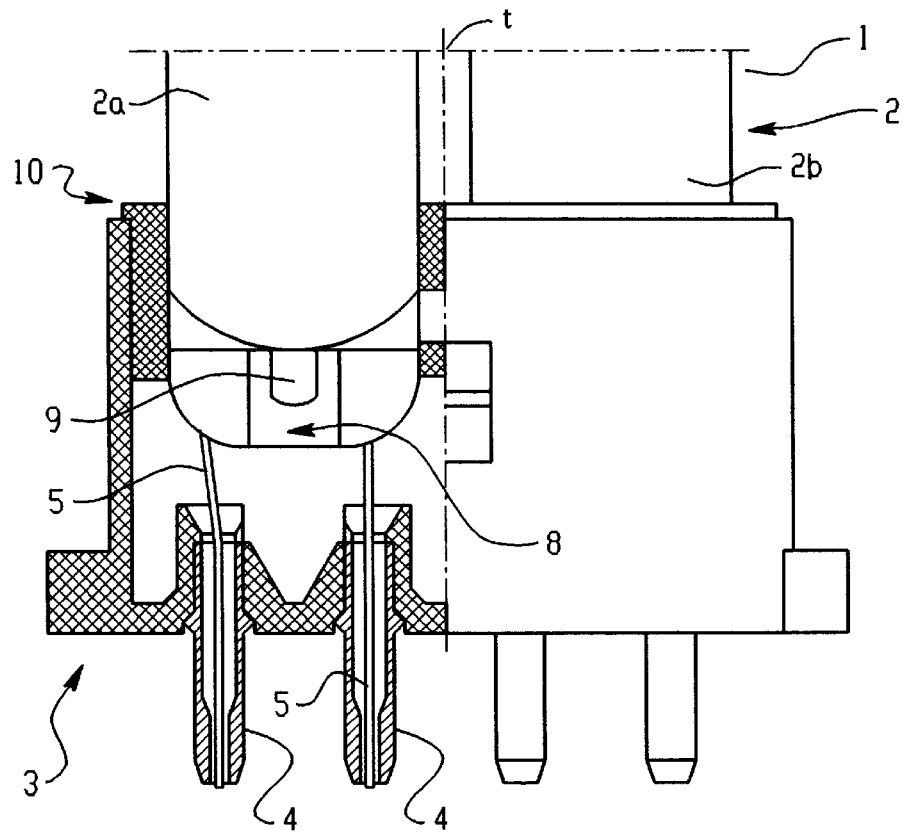
FIG. 1 shows an embodiment of the electric lamp according to the invention in semi-sectional view.

FIG. 1 illustrates a lamp 1 which is a compact fluorescent lamp comprising a light source 2 and a base part 3. The light source 2 is a discharge tube constructed in this example of two tube portions 2a and 2b connected to each other in a known way (the connection is not shown). Contact pins 4 are placed on the base part 3. During assembly of the lamp 1, a clip-like adapter piece 6 is placed on each of the glass tube portions 2a and 2b which nearly embrace the corresponding tube portions 2a and 2b. The adapter pieces 6 are placed symmetrically to lamp axis t.

Figure 2:
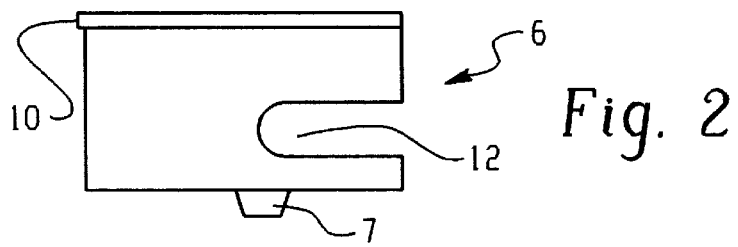
FIG. 2 illustrates the adapter piece used in the embodiment according to FIG. 1 in front view.
Figure 3:
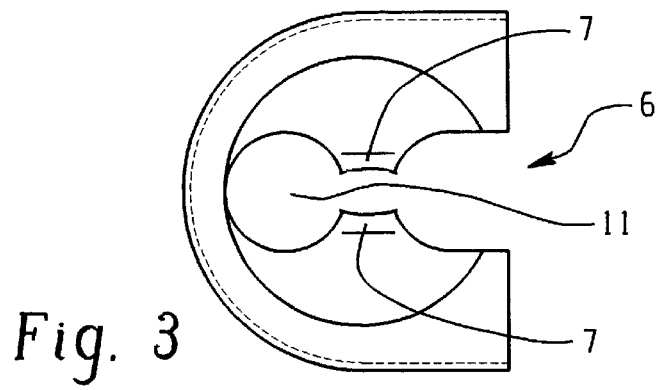
FIG. 3 shows the adapter piece according to FIG. 2 in top view.

FIGS. 2 and 3 show a possible way of constructing the adapter piece 6. The adapter piece 6 has an opening system 11 that is needed to provide for the resilience required for pulling the adapter piece 6 over the tube portions 2a and 2b, and the opening system 11 is also suitable for passing electrode leads 5 and, in a necessary case, an exhaust tube through. Opening 12 seen on opposite sides of the adapter piece 6 also contributes to the resilience thereof. The adapter piece 6 is fixed on the tube portion 2a in the way that one protruding closing component 7 is formed on each inner opposite sides of the adapter piece 6, and these closing components 7 are snapped into indentations 9 formed on the opposite sides of a pinched portion 8 of the tube portion 2a. The adapter piece 6 is made of a thermoplastic material with appropriate resilience, and its material is practically the same as that of the base part 3. After putting the adapter piece 6 on the tube portion 2a, the electrode leads 5 are inserted into the contact pins 4 of the base part 3, together with placing the ends of the light source 2 into the base part 3. After this, shoulder portion 10 formed on the adapter pieces 6 are seated on the rim of the base part 3, and are stuck to it, or another method is used to produce a permanent joint between the base part 3 and the adapter piece 6. This is followed by fixing the electrode leads 5 in the contact pins mechanically, e.g. by pressing, and by cutting the protruding wire ends off. The dimensions of the adapter pieces' inner surfaces seating on the discharge tube 2 and those of the adapter pieces' outer surfaces being in contact with the base part 3 are, with taking the resilience of the plastic material into account, to be chosen so that the adapter piece 6 has a close fit both to the discharge tube 2 and to the base part 3. This will result in that the support of the discharge tube is ensured.

The lamp according to the invention may, of course, be constructed in different ways besides by making use of the adapter piece according to the embodiment described beforehand. In addition, the solution may relate not only to a compact fluorescent lamp but also to other types of electric lamps. That is, the electric lamp according to the invention may be made and the method according to the invention may be utilized in many different ways in accordance with the scope of protection. Therefore, the invention is not intended to be limited to any of the features described in the example.

What is claimed is:

1. An electric lamp comprising:

a light source having electrical leads extending from a terminal end, a base part for supporting and for mechanically and electrically connecting the light source to a lampholder, the base part embracing the terminal end of the light source where the electrical leads of the light source are mechanically and electrically connected to contacts fixed on the base part for indirectly securing the base part to the light source at a location remote from the light source, and, an adapter piece interposed between and embracing at least one of the ends of the light source, the adapter piece including a shoulder which abuts the base part and is fixed to the end of the light source, and the adapter piece is fixed to the base part.

2. The electric lamp according to claim 1 characterized in that the material of the adapter piece is an elastic plastic material.

3. The electric lamp according to claim 1 wherein a pinched portion is formed at the ends of a glass bulb of the light source, and the adapter piece is formed to match to a surface indentation or protrusion made on the pinched portion, wherein said adapter piece is fixed to the pinched portion by means of a releasable joint.

4. The electric lamp according to claim 1 wherein an indentation is formed on the pinched portion, and a protruding closing component is formed on said adapter piece, and the closing component is snapped into the indentation.

5. The electric lamp according to claim 3 wherein an indentation is formed on the pinched portion, and a protruding closing component is formed on the adapter piece, and the closing component is snapped into the indentation.

6. The electric lamp according to claim 1 wherein said adapter piece is fixed to the base part by means of a permanent joint.

7. The electric lamp according to claim 1 wherein the lamp is a compact fluorescent lamp.

* * * * *